March 12, 1940.  E. R. HACMAC  2,193,232
LIQUID DISPENSING DEVICE
Filed May 17, 1939
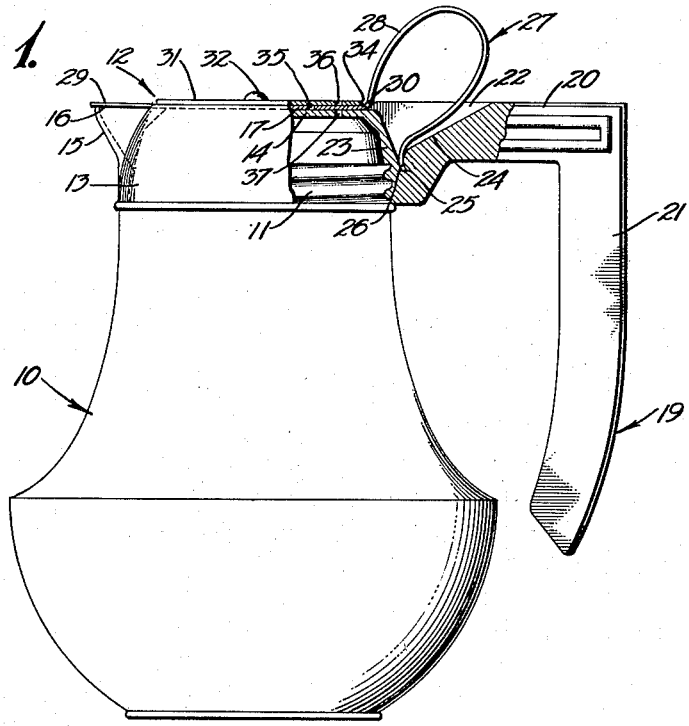
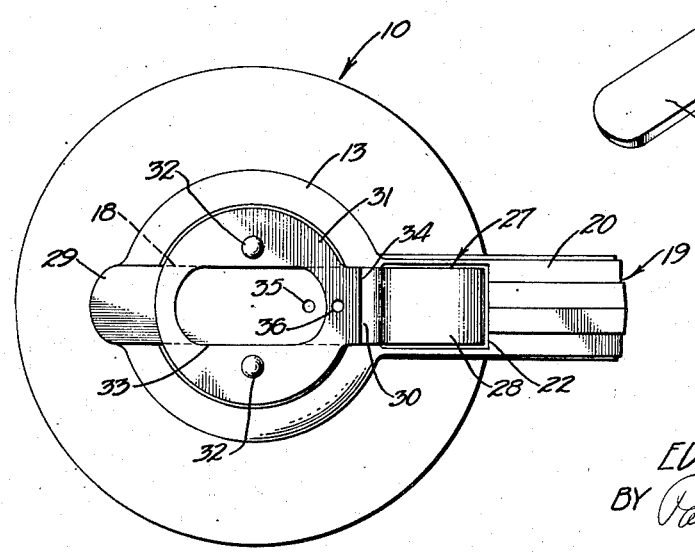
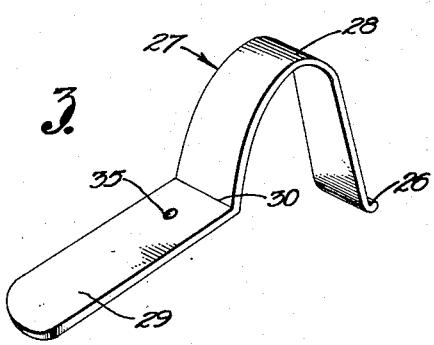
INVENTOR
EDWARD R. HACMAC
BY Parkinson & Lane
ATTORNEY Patented Mar. 12, 1940

2,193,232

UNITED STATES PATENT OFFICE 2,193,232

LIQUID DISPENSING DEVICE

Edward R. Hacmac, Hollywood, Calif., assignor to Na-Mac Products Corporation, Hollywood, Calif., a corporation of California Application May 17, 1939, Serial No. 274,085

2 Claims. (Cl. 65—31)

This invention relates to a container and particularly pertains to a liquid dispensing device associated therewith for dispensing liquids of any required degree of viscosity.

In the handling and dispensing of liquids from containers, and particularly containers within which viscous liquids are placed, such for example as syrup and the like for table use, it is desirable to provide a container which may be at all times sealed substantially hermetically and which may be easily opened to permit the liquid to be poured therefrom, and thereafter closed in a manner to completely seal the pouring spout and prevent the creation of drippings therefrom. It is also desirable to provide a detachable closure and dispensing device for containers which may be readily placed in position and which is fitted with a simple sanitary closure element. It is the principal object of the present invention, therefore, to provide a top for a container, which top embodies a pouring spout and with which spout a simple blade-shaped valve element is associated which may be readily moved to uncover the mouth of the spout and to at the same time create an air vent in the container to facilitate in pouring and which will instantly and automatically return to its closed position over the spout when released, the structure comprising a relatively few parts and a single moving element insuring that the device may be inexpensive both as to material and manufacturing costs.

The present invention contemplates the provision of a closure element preferably detachably disposed over the mouth of a container and embodying a pouring spout, the closure element carrying a handle by which the container may be lifted and manipulated, and associated with which handle and closure element is a resilient valve blade having a loop designed to be flexed when retracting the blade from its closing position, and which loop will distend when released to move the valve blade to its obstructing position over the mouth of the spout, the loop being so arranged as to be readily attached to and detached from the closure.

The invention is illustrated by way of example in the accompanying drawing, in which:

Figure 1 is a view in side elevation showing a container equipped with a dispensing device with which the present invention is concerned and indicating parts of the structure as being broken away for the sake of clearness.

Fig. 2 is a view in plan showing the top arrangement of the dispensing device.

Fig. 3 is a view in perspective showing the valve element.

Referring more particularly to the drawing, 10 indicates a container within which any desired fluid substance may be placed, such as liquid having a characteristic degree of viscosity, and which material is to be dispensed from the container. The container is here shown as having a relatively large open mouth, around the outer surface of the wall of which is formed a thread 11. It is to be understood that any desired expedient may be utilized to maintain a dispensing cover 12 thereon. The cover 12 may be formed of any suitable type of material but is here indicated as being pressed from a plastic material which forms a cylindrical body portion 13 internally threaded to receive the threads 11 of the container. The top wall of the body portion, as indicated at 14, closes the mouth of the container. Formed as a part of the body portion is a spout 15. This spout provides a lip which extends laterally from the wall 13, the mouth of which lip terminates in an upper flat plane 16. This plane is coincident with the bottom face 17 of a guideway 18 formed across the top face of the end wall 14 and disposed diametrically thereof. At a point on the diametrically opposite side of the dispensing cover 12 is a handle 19. This handle has a portion 20 extending substantially in a plane at right angles to the central axis of the container 10 and a grip portion 21 extending downwardly therefrom. The grip portion 21 is of such design and dimensions as are suitable to permit the handle to be conveniently grasped by a person manipulating the dispensing device. In the transverse portion 20 of the handle a recess 22 is formed having a wall 23 which is a part of the wall structure 13 and an inclined face 24 which is disposed at an angle to the face 23. At the apex of the faces 23 and 24 a recessed seat 25 is formed. This seat receives the hooked end 26 of the dispensing valve 27. The hooked end 26 is formed as a part of a resilient thumb loop 28, which as shown in Fig. 1 of the drawing projects upwardly from the top face of the handle element 20 and above the plane of the top of the cover 12. The loop portion of the dispensing element 27 is formed integral with and as a continuation of valve blade 29. The valve blade extends across the top of the dispensing cover 12 and lies in the guideway 18. The loop portion 28 and the valve blade 29 are disposed at an abrupt angle to each other, as indicated at 30. The valve blade is flat and is a continuation of the loop. The entire dispensing valve structure 27 is made of a single strip of spring steel so that when the loop 28 is flexed and disposed in the position shown in Fig. 1 its inherent resiliency will act to urge the blade forwardly in the guideway 18 and dispose the outer terminating end of the blade in a sealing position over the mouth of the spout 15. The dispensing valve is retained in its normal position due to the engagement of its hooked end 26 into the interlocking recess 25 and by reason of the fact that a retaining plate 31 is disposed over the top of the dispensing cover and across the top of the guideway 18. The retaining plate is here shown as being substantially circular and is held in position by rivets or other fastening means 32. The central portion of the plate is cut away, as indicated at 33, and reduces the friction between the plate and the valve blade and also reduces the area of the concealed surfaces of the structure which might otherwise become clogged with objectionable foreign material. At the edge of the retaining plate 31 adjacent to the loop 28 a stop shoulder 34 is provided. This shoulder is at right angles to the path of movement of the valve blade and is encountered by the face of the loop occurring at the bend 30 of the dispensing valve. By this arrangement the action of the loop 28 will urge the valve blade 29 toward its closed position so limited so that when pressure is released on the loop the valve blade 29 will move to its closed and obstructing position over the mouth 16 of the pouring spout. It will thus be seen that by this arrangement a spring pressed sliding closure is provided which comprises a single element made inexpensively from a piece of flat strip steel and easily formed to assume the configuration indicated in Fig. 3 of the drawing. In order that pouring of liquids may be facilitated an air vent is provided when the sliding closure is opened. This includes a vent hole 35 formed through the valve blade 29 and registering vent holes 36 and 37 formed through the retaining plate 31 and the top wall 14 of the cover, respectively. Thus, when the valve blade 29 is moved to its retracted position the three vent holes will register on a side of the container diametrically opposite that occupied by the pouring spout and possibility of creating an air lock in the container will be avoided.

In operation of the structure here disclosed the device is assembled as indicated in Fig. 1 of the drawing. When the structure is to be used the handle is grasped and the thumb of the hand is placed over the loop 28 flexing the loop in the general direction of the arrow in Fig. 1 of the drawing. As the loop flexes and swings toward the face 24 of the recess 22 the valve blade 29 will be retracted from its obstructing position over the mouth 16 of the pouring spout 15. At this same time the vent hole 35 in the blade 29 will move to a position of register with vent holes 36 and 37. When the pouring of liquid is complete the pressure upon the loop 28 is relieved and the inherent resiliency of the loop will force it forwardly to the position shown in Fig. 1 until the face of the loop adjacent the bend 30 encounters the stop 34, at which time the outer end of the valve blade 29 will stand in an obstructing position over the mouth of the spout.

In the event that it is desired to clean the structure the loop 28 may be compressed to release the hook 26 from engagement with the recess 25 so that the valve blade 29 may be retracted from its position within the guideway 18, thus allowing the valve blade to be washed and permitting free access to the guideway and the other parts of the dispensing cover so that it may be thoroughly cleansed and prepared ready for further use.

It will thus be seen that the structure here disclosed is simple in design, does not have a multiplicity of separate moving parts which are subject to wear, and around and between which extraneous matter may accumulate, and it will further be observed that the operation of the device is simple and direct both as to the movement of the dispensing valve and also to the matter of assembling or disassembling the structure.

While I have shown the preferred form of my invention as now known to me, it will be understood that various changes may be made in combination, construction and arrangement of parts by those skilled in the art, without departing from the spirit of my invention as claimed.

Having thus described my invention, what I claim and desire to secure by Letters Patent is:

1. A dispensing device including a cover element adapted to be removably disposed over the mouth of a container, a handle carried thereby and having a portion extending downwardly at the side of the container, a pouring spout formed as a part of the cover upon the opposite side from the handle, a guideway formed transversely of the top face of the cover and in a plane substantially coincident with the lip of the spout, a retaining element carried by the cover and bridging the guideway, a valve blade reciprocal within the guideway and beneath the retaining element whereby it may move to a closing position over the spout, a thumb loop formed as a continuation of said blade and being resilient in character, cooperating means carried at the free end of the thumb loop and upon the handle to retain the free end of the loop in a locked position and the loop under tension, said loop being resilient in character whereby the blade will be urged toward its closing position, and a stop on the retaining member to limit the movement of the blade toward a closed position.

2. A dispensing device including a cover element adapted to be removably disposed over the mouth of a container, a handle carried thereby and having a portion extending downwardly at the side of the container, a pouring spout formed as a part of the cover upon the opposite side of the handle, a guideway formed transversely of the top face of the cover and in a plane substantially coincident with the lip of the spout, a retaining element carried by the cover and extending at least partially over the guideway, a valve blade reciprocal within the guideway and beneath the retaining element whereby it may move to a closing position over the spout, a thumb loop formed as a continuation of said blade and being resilient in character, cooperating means carried at the free end of the thumb loop and upon the handle to retain the free end of the loop in a locked position and the loop under tension, said loop being resilient in character whereby the blade will be urged toward its closing position, and a stop on the retaining member to limit the movement of the blade toward a closed position.

EDWARD R. HACMAC.